United States Patent

[11] 3,552,543

[72] Inventor Peter J. Manetta
 Warren, Mich.
[21] Appl. No. 763,819
[22] Filed Sept. 30, 1968
[45] Patented Jan. 5, 1971
[73] Assignee Simplex Corporation
 Detroit, Mich.
 a corporation of Michigan

[54] ACCUMULATING LIFT AND CARRY CONVEYOR
 13 Claims, 5 Drawing Figs.
[52] U.S. Cl. .................................................. 198/219
[51] Int. Cl. ............................................... B65g 25/04
[50] Field of Search........................................... 198/19,
 218, 219

[56] References Cited
 UNITED STATES PATENTS
3,369,650 2/1968 Caretto ..................... 198/219

Primary Examiner—Edward A. Sroka
Attorney—Whittemore, Hulbert & Belknap

ABSTRACT: A conveyor for transferring articles from station to station in an operation which includes lifting the article, transporting it to the new station, and lowering the article into position. Means are provided to sense the presence or absence of an article at every station and to provide for advance of articles from every station in rear of the most advanced empty station.

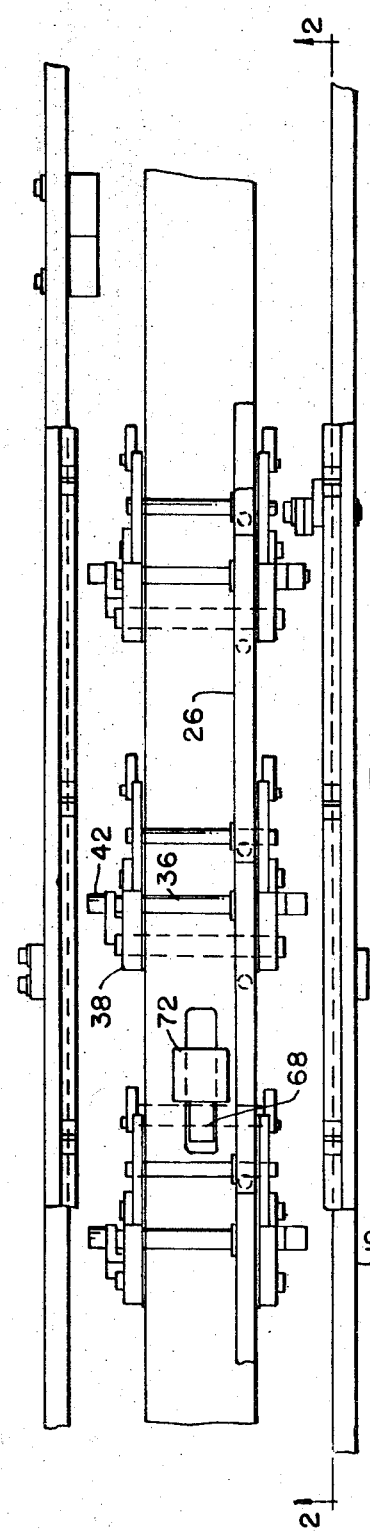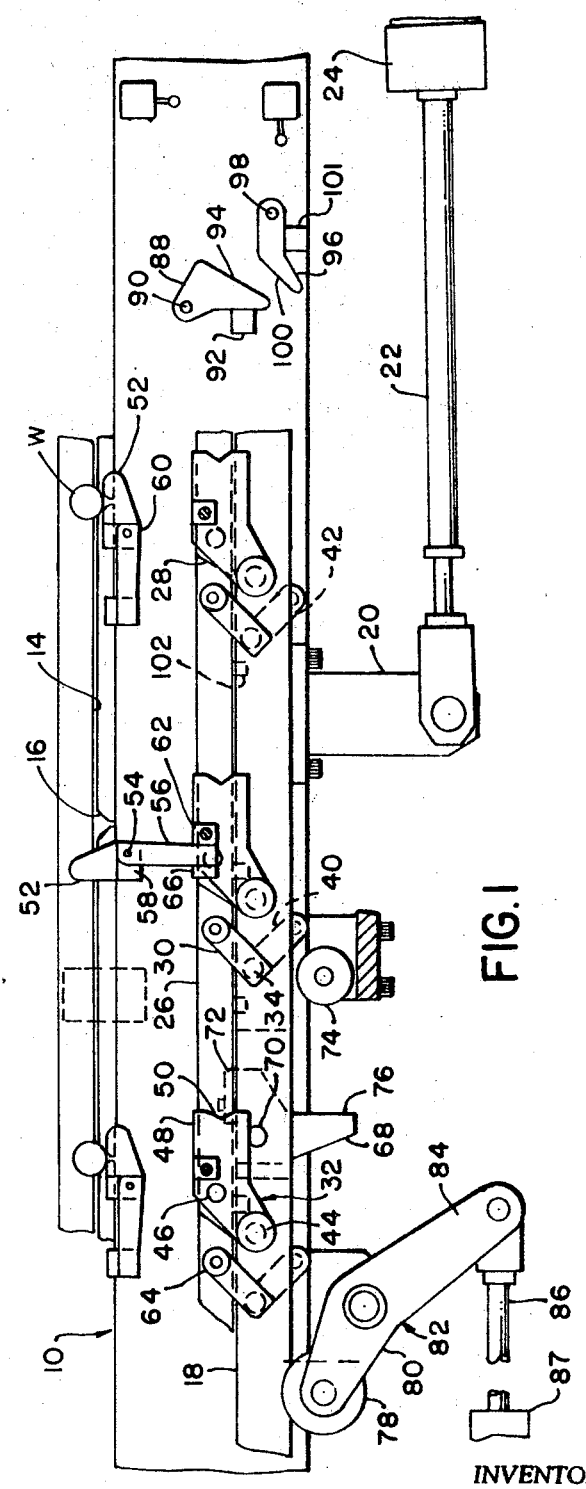

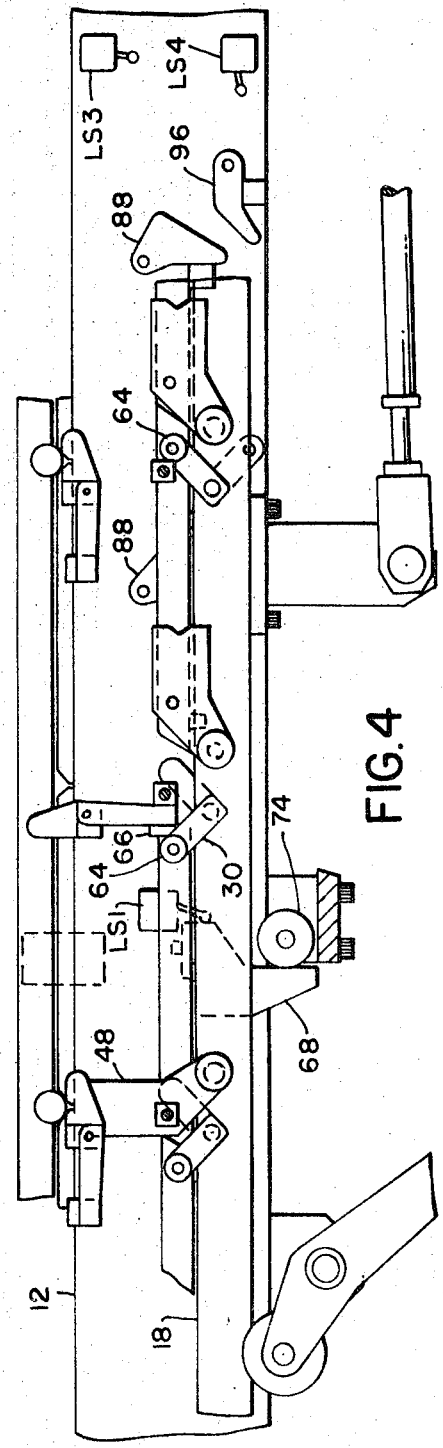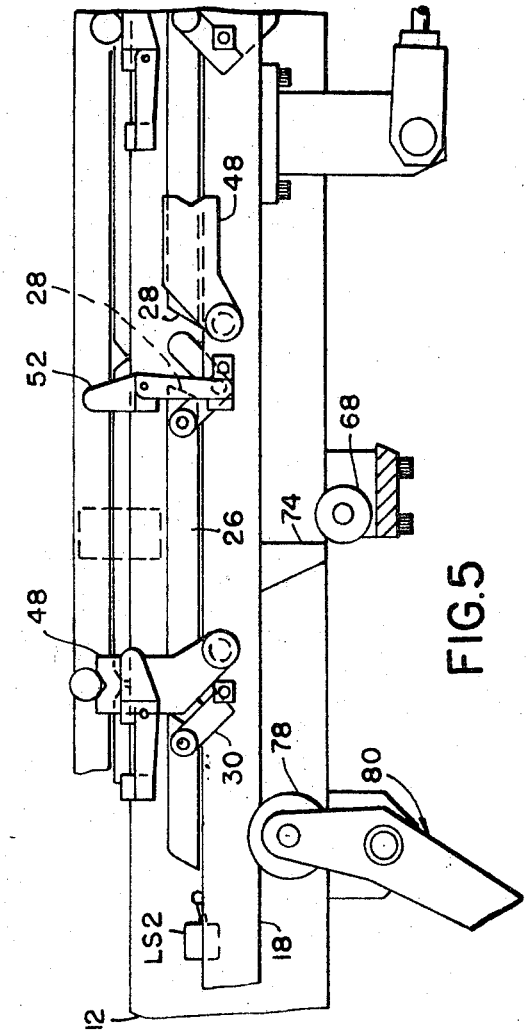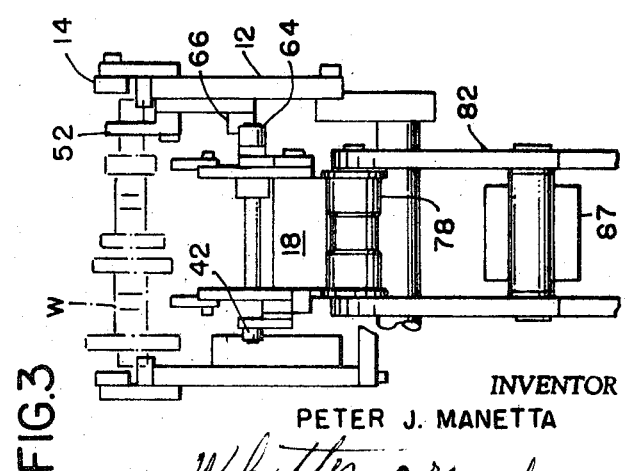

ACCUMULATING LIFT AND CARRY CONVEYOR

CROSS REFERENCE TO RELATED APPLICATIONS

This application is related to assignee's prior copending applications Ser. No. 662,353 filed Aug. 22, 1967, now U.S. Pat. No. 3,500,992 and Ser. No. 578,094 filed Sept. 8, 1966.

BRIEF SUMMARY OF THE INVENTION

In conveyor systems for supplying articles to assembly stations, it has been the practice to provide a multiplicity of spaced stations together with means for advancing articles from station to station. Initially, means were provided responsive to presence or absence of articles at each station and when an empty station was sensed, an article was advanced from the next rearmost station to fill the empty station. This of course resulted in vacating the previous station. A sequence of operations thus moved the empty station back to the beginning of the line and eventually eliminated it.

More recently, and as disclosed in the prior copending applications above identified, means have been provided operable mechanically to sense the presence or absence of articles at every station and for providing for advance of articles from every station in rear of the foremost empty station. In these earlier applications however, first means were provided for initially sensing the presence or absence of articles and for setting feed means for effecting advance of the articles. Separately operated means were then actuated to effect advance of the selected articles. In application Ser. No. 662,353, means were also provided for lifting the articles from their supports, transporting them in elevated condition to the next succeeding support, and there lowering them onto the support.

In accordance with the present invention means are provided for accomplishing the same purpose, but the apparatus is greatly simplified and rendered less expensive to build and operate.

Described in general terms, a sensing dog is positioned at each station and if that station is unoccupied the dog depends into operating position. A slide is provided and means are connected to the slide for effecting a reciprocation of the slide through a stroke substantially in excess of the distance between adjacent stations. Carried by the slide is a segmented control bar, each segment of which, in normal position, is in end abutment with the adjacent segments. Accordingly, when any given segment is moved relative to the slide, all of the segments in the direction toward which the actuated segment moves are correspondingly moved. Associated with each segment is a pivoted arm or link having a recessed article-supporting end which is moved by movement of its associated segment into an elevated position still somewhat below the level of the supported articles. The segment, and the links which support it, one of which comprises an article-supporting arm, are referred to collectively herein as a carrier.

Thereafter, the slide is actuated to an intermediate position determined by engagement between fixed stop means or abutments and in this position each article-supporting arm is positioned directly below an article to be transported. At this time the slide is elevated causing the activated article-supporting arms to engage the articles and to lift them into clearance with respect to the station at which they were supported. Thereafter, the slide continues its stroke, bringing the supported articles into position directly over the next succeeding article supporting station. At this time the slide is lowered, depositing the articles on their respective stations and moving the article-supporting arms into clearance with respect to the articles. On the return stroke, abutment means are provided which return all of the carriers including the sensing bar segments to initial position.

BRIEF DESCRIPTION OF THE DRAWINGS

FIG. 1 is a fragmentary side elevational view of the transfer apparatus.

FIG. 2 is a fragmentary plan view of the apparatus shown in FIG. 1.

FIG. 3 is a fragmentary end view of the apparatus shown in FIG. 1.

FIGS. 4 and 5 are views similar to FIG. 1, showing parts in different operating positions.

DETAILED DESCRIPTION

The conveyor in the present case is intended to maintain a supply of articles such for example as cluster gears indicated at W, and to advance them longitudinally of a stationary support frame 10 including bars 12 carrying support plates 14 provided with notches 16 constituting locating means which define the various stations.

Mounted for longitudinal movement relative to the frame 10 is a slide 18 having a bracket 20 rigidly attached thereto and connected to a piston rod 22 connected to a piston (not shown) located within a cylinder 24, the cylinder being pivoted for swinging movement in a vertical plane to accommodate vertical movement of the slide 18 as will subsequently be described.

Connected to the slide 18 is a segmented sensing bar composed of a multiplicity of end abutting segments 26. Each of the segments is provided with obliquely sloped ends 28 and adjacent ends of adjacent segments are engageable so that movement of any particular segment upwardly and to the left, as seen in FIG. 1, will similarly displace all of the segments to the left of the aforesaid particular segment.

The means mounting the individual segments for movement comprise a parallel linkage in which the link at the forward end of each segment 26 is designated 30 and a compound link 32 is provided adjacent the rear end of each segment 26. The link 30 has a pivot mounting 34 which connects it to the slide 18 and it is fixedly connected to a shaft 36 which extends to the opposite side of the slide 18 and there connects to a similar link 38 which however differs from the link 30 in that it is provided with an arm 40 carrying a roller 42 for a purpose which will presently be described.

The compound link 32 is provided in pairs at opposite sides of the slide 18. The link which produces the parallel motion of the segment 26 extends between a pivot mounting 44 between the link and the slide 18, and a pivot mounting 46 which connects the link to the bar segment 26. In addition, the compound links 32 comprise arms 48 which extend forwardly when the bar segments 26 are in their lower forward position. Upon actuation of the bar segments, the parallel links 30 and 32 swing through an angle of approximately 90° and the arm 48 moves to the vertically extending position illustrated in full lines in FIG. 4. Each of the arms 48 is provided with a recess or notch 50 shaped to interfit with an appropriate portion of the workpiece W.

The for operating the selected bar segments 26 in accordance with the condition of the work stations 16 will now be described.

Associated with each station 16 and pivoted to the frame 10 is a compound lever including a normally upwardly extending arm 52 which is pivoted to one of the frame bars 12 as indicated at 54. Connected to the pivot 54 is a second arm 56 which includes a shoulder 60 engageable with a shoulder 58 so that as the arm 52 is rotated in a clockwise direction by movement of a workpiece into the associated station, engagement between the shoulders 58 and 60 causes the depending arm 56 to be swung clockwise upwardly to a clearance or idle position. Thus, if all of the stations on the conveyor are occupied by a workpiece, all of the sensing arms 56 are elevated into idle position and reciprocation of the slide 18 does not effect movement of any workpiece.

However, if any station on the conveyor is empty, the arm 56 will depend from its pivot connection 54 and will assume a position in which its lower end engages a fixed abutment 62. Upon forward movement of the slide 18 a roller 64 carried by the link 30 engages the vertical surface of an abutment block 66 carried by arm 56 so that continued advance of the slide 18 forces the roller to move vertically and causes the link 30 to turn counterclockwise about the pivot 34. The parts are dimensioned such that sufficient advance of the slide 18 occurs to effect 90° rotation of the link 30. Due to the parallel linkage arrangement, this movement of the link 30 is accompanied by corresponding movement of the links 32 and a movement of the bar segments 26 first upwardly and then rearwardly. This movement in turn effects rotation of the arm 48 of the compound link 32 to the full line position illustrated in FIG. 4.

Forward movement of the slide 18 is accomplished by the admission of hydraulic fluid to the cylinder 24 and control of the flow of fluid to and from the cylinder is effected by suitable solenoid-actuated valve means (not shown). The stroke of the slide 18 is sufficient to permit the just described movement to set the work-supporting lever arms 48 in upright position and thereafter to effect the required travel from station to station. For example, if the stations are located 12 inches apart it is convenient to provide for an initial movement of 4 inches, after which the work-supporting arms are elevated by mechanism presently to be described, and thereafter the workpieces are advanced 12 inches to the next successive station.

In order to insure exact location of the work-supporting arms 48 directly beneath the workpieces W when they are elevated, a dog 68 is provided which is pivoted to the slide 18 as indicated at 70. The dog 68 is freely movable in a counterclockwise direction from the position shown in FIG. 1, but its rotation in the opposite direction from this position is prevented by a plate 72 fixed to the dog 68. Fixed to the frame 10 is a stop roller 74 which is engageable by a vertical surface 76 provided on the dog 68. Accordingly, when hydraulic fluid is admitted to the cylinder 24 in the proper direction, the slide 18 moves to the right until this movement is arrested by engagement between the surface 76 and the roller 74.

The slide 18 is supported on a plurality of transversely extending rollers 78 carried by an arm 80 of a lever 82, the other arm 84 of which is connected to a piston rod 86 extending from a piston located within a second cylinder 87. A plurality of supporting rollers 78 are provided and the arms 80 supporting these rollers are connected by suitable linkage (not shown) so that the slide 18 may be elevated vertically while maintained in strictly horizontal relationship. Vertical movement of the slide 18 elevates the dog 68 to a position above the roller 74 and hence permits further movement of the slide 18 to the right. At the same time this vertical movement of the slide results in the work-supporting arms 48 engaging the workpieces W at the appropriate stations. Thereafter, suitable limit switches are actuated by upward movement of the slide 18 and movement of the slide to the right to the end of the stroke is initiated. At the end of the stroke, lever 82 is reversely actuated by its piston and cylinder means, and the slide 18 is accordingly lowered to its lowermost horizontal position. This will result in depositing the workpiece at the next station.

In order to restore the transfer mechanism for a subsequent sensing and work-lifting and carrying operation, means are provided for shifting all of the bar segments 26 forwardly and then downwardly to the initial position illustrated in FIG. 1. For this purpose, the roller 42 carried by the arm 40 of each of the bar segments is movable into engagement with a dog 88 which is pivoted to the frame 10 as indicated at 90 and which in this position engages a fixed stop 92. The dog 88 has an inclined surface 94 engageable by the roller 42 and as the slide 18 moves to the left the roller 42 engages the surface 94 swinging the associated links 30 and 38 as well as the parallel links 32 and the bar segments 26 upwardly and to the right relative to the slide 18, thus restoring the parts to the initial position. A second dog 96 is pivoted to the frame 10 as indicated at 98 and has an inclined surface 100 engageable by the dogs 42 on downward movement so as to control this movement in timed relation to movement of the slide 18. Otherwise, as the bar segments reach overcenter position they would drop into engagement with the slide 18 by gravity. If the carrier at a particular station has not been activated, roller 42 moves forwardly against lever 88 and swings it away from stop 92. The roller returns below lever 96, and swings lever 96 away from its stop 101. Dogs 88 and 96 are provided in association with each station.

To cushion the impact when segments 26 are moved to the left relative to slide 18, resilient buttons 102 of a suitable material such for example as urethane, are provided in recesses in the upper surface of the slide 18. The buttons extend slightly above the surface and are engaged by the underside of the bar segments 26.

From the foregoing it will be observed that the mechanical movement of parts is effected by controlled operation of only two power cylinders 24 and 87. The actual timing and sequence of the movements may be accomplished by solenoid-actuated valves (not shown), the control of the solenoids being effected by limit switches. On the initial stroke of the slide 18, a limit switch LS1 is operated as the dog 68 engages the stop roll 74, which will have the effect of operating a solenoid-controlled valve to close both the inlet and outlet ports of the cylinder 24. This will insure that the slide 18 remains in the position which aligns all of the activated carriers 48 with the associated workpieces W. The limit switch LS1 also at the same time actuates the solenoid-controlled valve connected to the cylinder 87 to effect upward movement of the slide 18.

Similarly, a limit switch LS2 is operated as the slide 18 reaches its elevated position, which shuts off flow of fluid to the cylinder 87 and readmits fluid under pressure to the cylinder 24 in a direction to continue the feeding stroke of the slide 18.

A third limit switch LS3, in position to be engaged as the slide 18 reaches its furthermost position to the right as seen in FIG. 1, closes both the inlet and outlet ports to the cylinder 24 and at the same time operates the valve in control of the supply of fluid to the cylinder 87 so as to cause the slide 18 to move to its lowermost position.

A fourth limit switch LS4 is operated as the slide reaches its lowermost position and has the effect of closing the valve supplying fluid to the cylinder 87 and admitting fluid to the opposite end of the cylinder 24 to effect a return stroke of the slide 18. If desired, the slide 18 may reciprocate continuously, in which case return movement of the slide 18 to its initial position may trip a limit switch operating the solenoid-controlled valve connected to the cylinder 24 to initiate a second cycle.

The drawings and the foregoing specification constitute a description of the improved accumulating lift and carry conveyor in such full, clear, concise and exact terms as to enable any person skilled in the art to practice the invention the scope of which is indicated by the appended claims.

I claim:

1. An accumulating conveyor comprising an elongated frame having a multiplicity of equally spaced work support stations, a slide movable longitudinally of said frame, means for reciprocating said slide in back and forth strokes having an amplitude exceeding the spacing between stations, means for elevating and lowering said slide, a plurality of individually movable carriers on said slide, abutment means acting between each pair of adjacent carriers operable on movement of any one of said carriers from an idle to a feed position to move all carriers to the rear of said one carrier to feed position, a control arm carried by said frame at each station having a cam normally in operative position but movable by a workpiece at such station to inoperative position, an element connected to each carrier engageable with the associated control arm cam when the control arm is in operative position to shift the associated carrier to feed position beneath its associated station during initial movement of said slide in feed direction from a starting position to an intermediate position in which the carriers in feed position are directly beneath workpieces at the associated stations, means for actuating said slide elevating and lowering means to elevate said slide and carriers at said intermediate positions to cause said carriers to lift the workpieces at the associated stations, means for thereafter actuating said slide-reciprocating means to continue advance of said slide to advance the workpieces lifted by said carriers to the next station, means for thereafter actuating said slide elevating and lowering means to lower said slide to deposit workpieces at said next station, means for thereafter actuating said slide-reciprocating means to return said slide to initial position, and means engageable with said carriers to return said carriers to idle position during return movement of said slide.

2. An accumulating conveyor as defined in claim 1 in which said carriers each comprises an elongated member having a length equal to the spacing between stations, and which includes parallel links pivotally supporting said members on said slide, one of said links having an arm movable to upwardly extending feed position and having a work support configuration at its upper end.

3. An accumulating conveyor as defined in claim 2 in which said links are movable through an arc of approximately 90° through an upwardly extending vertical position upon forward movement of said slide-following engagement between the elements associated therewith and said cams.

4. An accumulating conveyor as defined in claim 3 in which said means for returning said carriers to idle position comprise movable cams, and abutment means holding said movable cams in operative positions during return movement of said slide.

5. An accumulating conveyor as defined in claim 4, said movable cams comprising pivoted arms movable by said carriers to inoperative position on forward movement of said slide.

6. An accumulating conveyor as defined in claim 4 in which said carriers move overcenter during movement between idle and feed position, and means to control movement of one portion thereof in timed relation to movement of said slide.

7. An accumulating conveyor as defined in claim 1 comprising abutment means acting between said slide and said frame to terminate advance of said slide with said carriers directly beneath associated stations, said last mentioned abutment means being shaped to disengage upon elevation of said slide.

8. An accumulating conveyor as defined in claim 7 in which said elements engageable with said control arm cams are movable upwardly by upward movement of said slide to positions above said cams to provide for further forward movement of said slide.

9. A lift and carry conveyor comprising an elongated stationary frame providing a series of equally spaced article-supporting stations, a slide movable longitudinally of said frame, mechanical article-sensing devices on said frame at each station, individually movable article carriers on said slide movable between idle and feed positions, one-way positive acting mechanical means acting between each pair of adjacent carriers operable when any one carrier is shifted to feed position to move all carriers to the rear of said one carrier to feed position, an element on each carrier engageable with the article-sensing device at the empty station to which said carrier can deliver an article and operable through said positive acting means to move said carrier to feed position and to move all carriers to the rear of the said carrier moved to feed position.

10. A conveyor as defined in claim 9, comprising means for sequentially elevating said slide and carriers while said carriers remain at associated stations to elevate articles from support stations, advancing said slide to move articles forwardly to the next succeeding station, lowering said slide and carriers to deposit articles on the next succeeding station, and returning said slide and carriers to initial position.

11. Mechanism as defined in claim 10, which comprises rigid abutment means operable on return movement of said slide engageable with said carriers to shift said carriers to idle position.

12. Mechanism as defined in claim 11, said abutment means comprising guide means to control return movement of said carriers in timed relation to movement of said slide.

13. An accumulating conveyor comprising an elongated frame having a multiplicity of equally spaced support stations, a slide movable longitudinally of said frame, means for reciprocating said slide in forward feeding and reverse strokes having an amplitude at least as great as the spacing between said stations, means for elevating and lowering said slide, a plurality of carriers on said slide, each of said carriers being independently movable on said slide between idle and feed positions, abutment means acting between each pair of adjacent carriers operable on movement of any one of said carriers from an idle to a feed position to move all carriers to the rear of said one carrier to feed position, a control arm carried by said frame at each station having a cam normally in operative position but movable by a workpiece at such station to inoperative position, an element connected to each carrier engageable with the associated control arm cam when the control arm is in operative position to shift the associated carrier to feed position beneath its associated station during and as a consequence of movement of said slide, means for actuating said slide-elevating and lowering means to elevate said slide and carriers to cause the carriers in feed position to lift the workpieces at the associated stations, means for thereafter actuating said slide-reciprocating means to advance the slide to advance the workpieces lifted by said carriers to the next station, means for thereafter actuating said slide-elevating and lowering means to lower said slide to deposit workpieces at said next station, and means for thereafter actuating said slide-reciprocating means to return said slide to initial position, said carriers having means connected thereto effective to return all carriers in feed position to idle position during reverse reciprocation of said slide.